(12) United States Patent
Takagi et al.

(10) Patent No.: US 12,228,178 B2
(45) Date of Patent: Feb. 18, 2025

(54) VEHICLE, METHOD FOR CONTROLLING VEHICLE AND CONTROLLER FOR VEHICLE

(71) Applicant: KAWASAKI MOTORS, LTD., Hyogo (JP)

(72) Inventors: Katsuya Takagi, Kobe (JP); Shohei Mizuishi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 114 days.

(21) Appl. No.: 18/089,159

(22) Filed: Dec. 27, 2022

(65) Prior Publication Data

US 2024/0209907 A1 Jun. 27, 2024

(51) Int. Cl.
*F16H 48/16* (2006.01)
*F16D 48/06* (2006.01)

(52) U.S. Cl.
CPC .... *F16D 48/066* (2013.01); *F16D 2500/1026* (2013.01); *F16D 2500/1045* (2013.01);
(Continued)

(58) Field of Classification Search
CPC .............. F16D 48/066; F16D 48/08; F16D 2500/1045; F16D 2500/1026; F16D 2500/30405; F16D 2500/30404; F16D 2500/30406; F16D 2500/30407; F16D 2500/3056; F16D 2500/10412; F16D 2500/3111; F16D 2500/3144; F16D 2500/50224; F16D 2500/5102; F16D 2500/5104; F16D 2500/5106; F16D 2500/70404; F16D 2500/70426;
(Continued)

(56) References Cited

U.S. PATENT DOCUMENTS

2005/0197232 A1* 9/2005 Matsumura ......... F16H 61/0437
477/5
2005/0283298 A1* 12/2005 Ochi ................. B60W 30/1843
701/67

(Continued)

FOREIGN PATENT DOCUMENTS

EP 1783393 A2 * 5/2007 ............. F16D 48/08
JP 2021-165557 10/2021

*Primary Examiner* — Timothy Hannon
(74) *Attorney, Agent, or Firm* — Wenderoth, Lind & Ponack, L.L.P.

(57) ABSTRACT

A vehicle includes a drive source, driving wheels driven by a driving force output from the drive source, and a clutch disposed between the drive source and the driving wheels. The clutch is switchable to an arbitrary fastening position between a connection state enabling transmission of the driving force between the drive source and the driving wheels, and a disconnection state disconnecting the transmission. A clutch actuator applies a fastening load to the clutch and provides a torque transmission capacity corresponding to the fastening load to the clutch. A controller controls operation of the drive source and operation of the clutch actuator. The controller includes a clutch temperature estimation circuit estimating the temperature of the clutch, and a driving force adjustment circuit performing driving force adjustment control to adjust the driving force transmitted to the downstream side of the clutch based on the estimated temperature of the clutch.

12 Claims, 5 Drawing Sheets

(52) U.S. Cl.
CPC .............. *F16D 2500/30405* (2013.01); *F16D 2500/30406* (2013.01); *F16D 2500/3056* (2013.01); *F16D 2500/5106* (2013.01); *F16D 2500/70404* (2013.01); *F16D 2500/7101* (2013.01)

(58) Field of Classification Search
CPC ... F16D 2500/70428; F16D 2500/7043; F16D 2500/70458; F16D 2500/70462; F16D 2500/7101; F16D 2500/7104; B60W 10/02; B60W 10/06; B60W 2510/0291; B60W 2710/025; B60W 30/1843
See application file for complete search history.

(56) References Cited

U.S. PATENT DOCUMENTS

| | | | |
|---|---|---|---|
| 2014/0129066 A1* | 5/2014 | Inoue ................. | B60W 30/186 903/946 |
| 2015/0323395 A1* | 11/2015 | Kawakami ............. | G01N 25/18 702/130 |
| 2021/0140496 A1* | 5/2021 | Watanabe ............... | F16D 21/00 |
| 2021/0310525 A1 | 10/2021 | Nishiyabu et al. | |

* cited by examiner

VEHICLE, METHOD FOR CONTROLLING VEHICLE AND CONTROLLER FOR VEHICLE

BACKGROUND OF THE INVENTION

Technical Field

The present disclosure relates to a vehicle, a controlling method for a vehicle, and a controller for a vehicle.

Related Art

JP 2021-165557 A discloses a hydraulic multiple disc clutch that exerts a predetermined engaging force by axially displacing a plurality of friction plates by an external hydraulic pressure.

SUMMARY

A hydraulic multiple disc clutch may be mounted on a driving force transmission path between a driving source and a driving wheel in a vehicle. In that case, for example, when the vehicle travels on a rocky place or the like, there is a case where the driving wheel is fitted to the rocky place or the like and cannot be rotationally driven, and there is a case where the driving wheel cannot be rotationally driven against its own weight acting on the vehicle at the time of starting from a stop on a steep slope. At that time, the plurality of friction plates provided in the hydraulic multiple disc clutch includes a drive-side friction plate that rotates integrally with the rotating drive source side and a drive-wheel-side friction plate that is stopped, and they slip with each other in a half-clutch state at the start and become high temperature due to frictional heat. If this state continues for a long time, there is a risk that the clutch is finally seized.

An object of the present disclosure is to provide a vehicle capable of suppressing seizure of a clutch.

An aspect of the present disclosure is to provide a vehicle including:

a drive source;
a driving wheel driven by a driving force output from the drive source;
a clutch disposed between the drive source and the driving wheel, the clutch being switchable to an arbitrary fastening position between a connection state that enables transmission of the driving force between the drive source and the driving wheel and a disconnection state that disconnects the transmission;
a clutch actuator that applies a fastening load to the clutch and provides a torque transmission capacity corresponding to the fastening load to the clutch; and
a controller that controls operation of the drive source and operation of the clutch actuator.

The controller includes:
a clutch temperature estimation circuit that estimates the temperature of the clutch; and
a driving force adjustment circuit that performs driving force adjustment control to adjust the driving force transmitted to the downstream side of the clutch on the basis of the estimated temperature of the clutch.

According to the present disclosure, since the driving force transmitted to the downstream side of the clutch is limited on the basis of the estimated temperature of the clutch, the clutch is prevented from being seized.

Another aspect of the present disclosure is to provide a control method for a vehicle, the vehicle including a drive source;
a driving wheel driven by a driving force output from the drive source;
a clutch disposed between the drive source and the driving wheel, the clutch being switchable to an arbitrary fastening position between a connection state that enables transmission of the driving force between the drive source and the driving wheel and a disconnection state that disconnects the transmission;
a clutch actuator that applies a fastening load to the clutch and provides a torque transmission capacity corresponding to the fastening load to the clutch; and
a controller that controls operation of the drive source and operation of the clutch actuator.

The method includes
estimating the temperature of the clutch; and
adjusting the driving force transmitted to the downstream side of the clutch on the basis of the estimated temperature of the clutch.

Still another aspect of the present disclosure is to provide a controller for a vehicle, the vehicle including:

a drive source;
a driving wheel driven by a driving force output from the drive source;
a clutch disposed between the drive source and the driving wheel, the clutch being switchable to an arbitrary fastening position between a connection state that enables transmission of the driving force between the drive source and the driving wheel and a disconnection state that disconnects the transmission; and
a clutch actuator that applies a fastening load to the clutch and provides a torque transmission capacity corresponding to the fastening load to the clutch.

The controller includes
a clutch temperature estimation circuit that estimates the temperature of the clutch; and
a driving force adjustment circuit that performs driving force adjustment control to adjust the driving force transmitted to the downstream side of the clutch on the basis of the estimated temperature of the clutch.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

Hereinafter, a vehicle 1 according to an embodiment of the present disclosure will be described with reference to the accompanying drawings. Note that the following description is merely exemplary in nature, and is not intended to limit the present disclosure, its application, or its use.

In the following description, the front-rear direction, the left-right direction, and the up-down direction as viewed from the driver are referred to as the front-rear direction, the left-right direction, and the up-down direction of the vehicle and each component.

Figure 1:
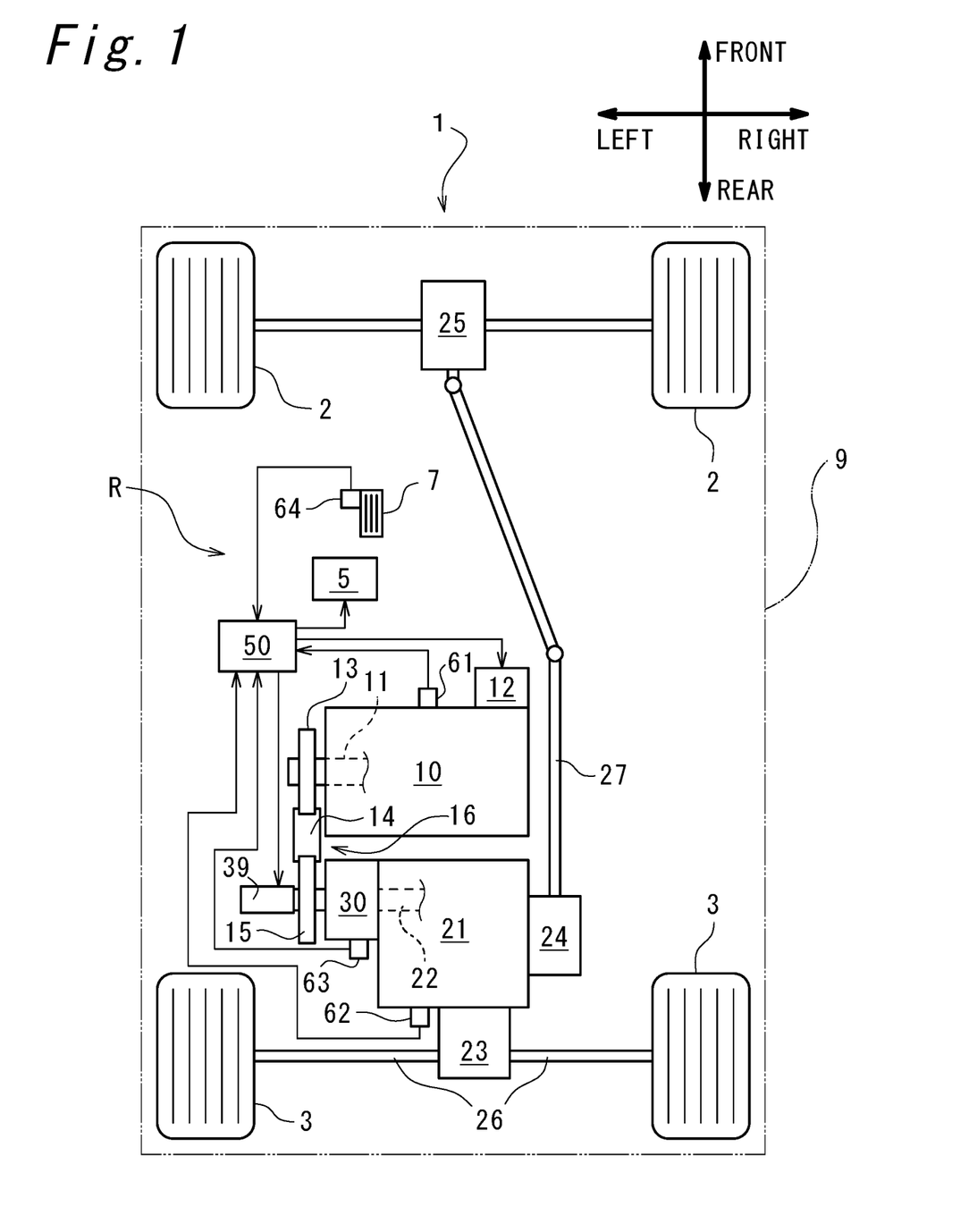
FIG. 1 is a diagram schematically illustrating a vehicle according to an embodiment of the present disclosure.

FIG. 1 is a plan view illustrating a schematic configuration of the vehicle 1. As illustrated in FIG. 1, a vehicle 1 includes left and right front wheels 2 disposed at a front end portion of a vehicle body 9 and left and right rear wheels 3 disposed at a rear end portion of the vehicle body 9. A riding space R of the vehicle 1 is provided with an accelerator pedal 7 to be depressed by a driver and a display 5 that displays various types of information such as a vehicle speed and an engine speed.

The vehicle 1 also includes an engine 10 as a driving source, a transmission 21, and a clutch 30. In the present embodiment, the transmission 21 is disposed behind the engine 10. The clutch 30 is disposed on the left side of the transmission 21. A rear differential device 23 for the rear wheels 3 is disposed on the rear side of the transmission 21. A two-wheel-drive and four-wheel-drive switch 24 is disposed on the right side of the transmission 21. A front differential device 25 for the front wheels 2 is disposed between the left and right front wheels 2.

The two-wheel-drive and four-wheel-drive switch 24 switches the driving state between a four-wheel drive state in which the driving force shifted by the transmission 21 is transmitted to the front wheel 2 side in addition to the rear wheel 3 side and a two-wheel drive state in which the power transmission to the front wheel 2 side is interrupted and only the rear wheel 3 side is driven. That is, in the present embodiment, the rear wheels 3 are configured as driving wheels in the two-wheel drive state, and the front wheels 2 and the rear wheels 3 are configured as driving wheels in the four-wheel drive state.

The driving force output from the engine 10 is input to the transmission 21 via the clutch 30, and is changed to a gear ratio corresponding to the drive state in the transmission 21. The driving force shifted in the transmission 21 is distributed to the left and right rear wheels 3 via the rear differential device 23. In the four-wheel drive state, the driving force output from the two-wheel-drive and four-wheel-drive switch 24 is also distributed to the left and right front wheels 2 via the front differential device 25. That is, a driving force transmission path from the engine 10 to the driving wheels 2 and 3 via the clutch 30 and the transmission 21 is configured.

In the present embodiment, the engine 10 is a gasoline engine disposed such that a crankshaft 11 as an output shaft is oriented in the vehicle width direction. The engine 10 may be a single-cylinder engine, a multi-cylinder engine, or a diesel engine. The engine 10 includes a throttle valve 12 that adjusts an intake air amount. The opening degree of the throttle valve 12 is electronically controlled by a controller 50 described later.

The rotation of the crankshaft 11 is transmitted to a clutch drive shaft 40 of the clutch 30 via a power transmission mechanism 16. The power transmission mechanism 16 includes a drive gear 13 integrally rotatably attached to the crankshaft 11, a driven gear 15 integrally rotatably attached to the clutch drive shaft 40 that is an input shaft to the clutch 30, and an idle gear 14 disposed between the drive gear 13 and the driven gear 15 and meshing with the drive gear 13 and the driven gear 15. That is, the rotation of the crankshaft 11 is transmitted to the clutch drive shaft 40 via the drive gear 13, the idle gear 14, and the driven gear 15.

Figure 2:
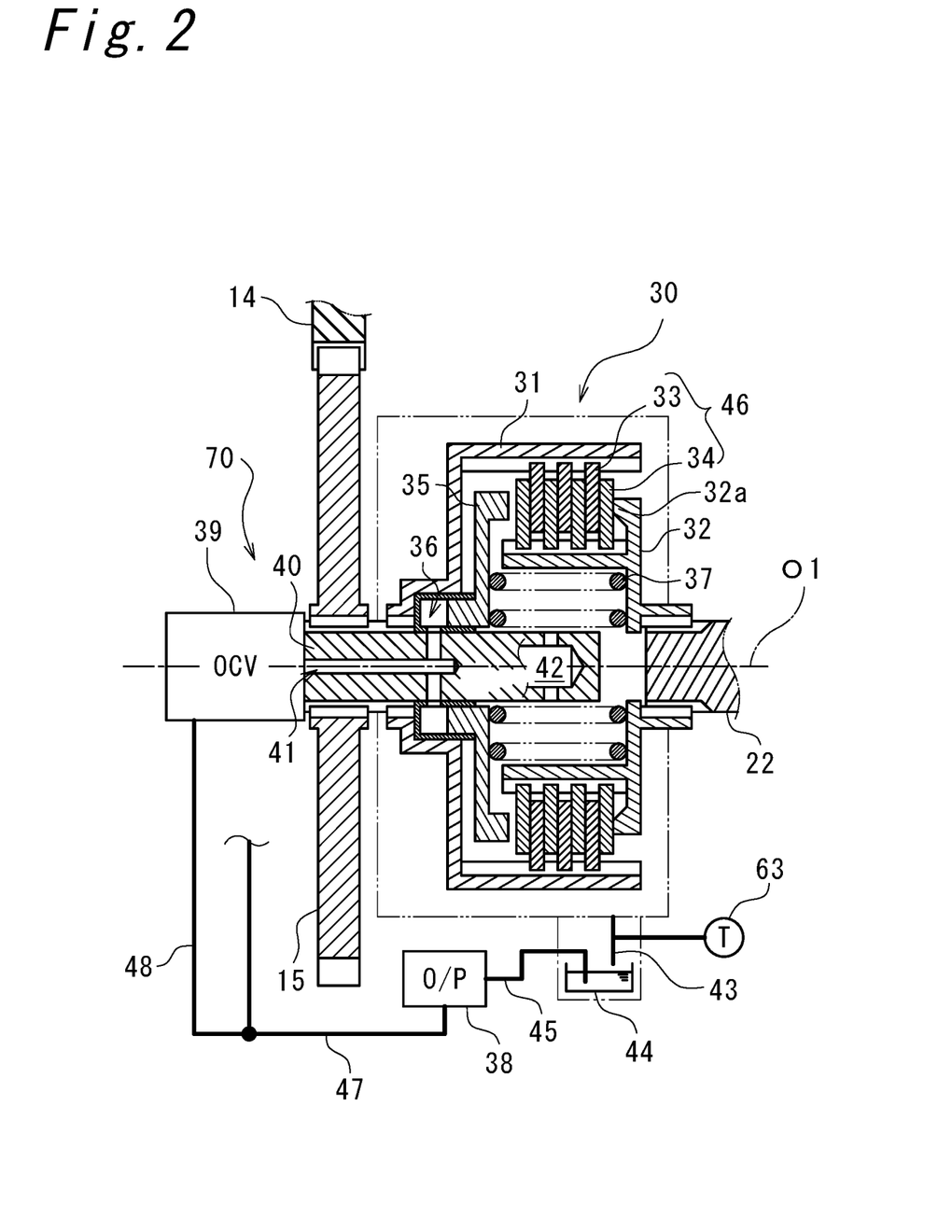
FIG. 2 is a cross-sectional view illustrating a schematic configuration of a clutch.

FIG. 2 is a cross-sectional view of the clutch 30 taken along the clutch drive shaft 40, illustrating a schematic configuration of the clutch 30. As illustrated in FIG. 2, the clutch 30 includes an outer drum 31 provided so as to be rotatable integrally with the clutch drive shaft 40, and an inner hub 32 provided on the inner peripheral side of the outer drum 31 and provided so as to be rotatable integrally with the transmission input shaft 22 of the transmission 21.

The outer drum 31 is formed in a cylindrical shape. A plurality of first friction plates 33, which are movable in an axial direction O1 of the clutch 30 and provided to be integrally rotatable in the circumferential direction with the outer drum 31, are spline-fitted to the inner peripheral portion of the outer drum 31.

The inner hub 32 is formed in a cylindrical shape. A plurality of second friction plates 34, which are movable in the axial direction O1 of the clutch 30 and provided to be integrally rotatable in the circumferential direction with the inner hub 32, are spline-fitted to the outer peripheral portion of the inner hub 32. The plurality of first friction plates 33 and the plurality of second friction plates 34 (hereinafter, may be collectively referred to as a plurality of friction plates 46) are alternately arranged in the axial direction O1. The inner hub 32 has a stopper 32a facing the plurality of friction plates 46 from the right side.

The clutch 30 further includes a piston 35 provided to be movable in the axial direction O1, a piston chamber 36 that generates a hydraulic pressure for moving the piston 35 in the axial direction O1, and a spring 37 that biases the piston 35 to the opposite side against the hydraulic pressure. In the present embodiment, the piston 35 is located on the left side of the plurality of friction plates 46, and biases the plurality of friction plates 46 to the right side by the hydraulic pressure applied from the piston chamber 36. The spring 37 is located on the right side of the piston 35 and biases the piston 35 to the left side.

The clutch drive shaft 40 is formed with a first oil passage 41 and a second oil passage 42, each extending in the axial direction O1. The first oil passage 41 communicates with the piston chamber 36. The second oil passage 42 communicates with a space in which the plurality of friction plates 46 are accommodated.

The clutch 30 further includes, for example, an oil pump 38 rotationally driven by the clutch drive shaft 40 and an oil control valve 39 attached to a left end portion of the clutch drive shaft 40. The oil discharged from the oil pump 38 is supplied to the second oil passage 42 via the line pipe 47.

The oil supplied to the second oil passage 42 is supplied to the plurality of friction plates 46 to cool the plurality of friction plates 46, and also acts as lubricating oil for reducing friction between the plurality of friction plates 46 when the friction plates are not completely fastened. The oil supplied to the plurality of friction plates 46 is collected in an oil receiver 44 via a drain pipe 43. The oil stored in the oil receiver 44 is sucked up to the oil pump 38 via a strainer 45.

Oil is supplied to the oil control valve 39 through a branch pipe 48 branched from a line pipe 47. The oil control valve 39 is a linear control valve whose operation is electrically controlled by a controller 50 to continuously change the hydraulic pressure of the supplied oil. The oil whose hydraulic pressure is adjusted by the oil control valve 39 is supplied to the piston chamber 36 via the first oil passage 41.

As a result, the piston 35 receives a force corresponding to the hydraulic pressure in the piston chamber 36 and moves to the right. Therefore, when the piston 35 moves to the right side, the plurality of friction plates 46 are sandwiched between the piston 35 and the stopper 32a and are fastened with a load corresponding to the hydraulic pressure in the piston chamber 36. On the other hand, when the force acting on the piston 35 by the hydraulic pressure is weaker than the biasing force by the spring 37, the piston 35 moves to the left side and the fastening of the plurality of friction plates 46 is released.

Therefore, the oil control valve 39, the first oil passage 41, the piston chamber 36, and the piston 35 constitute a clutch actuator 70 that applies a fastening load to the clutch 30 and provides a torque transmission capacity according to the fastening load. The clutch 30 is configured as a multiple disc hydraulic clutch configured to be switchable by the clutch actuator 70 to an arbitrary fastening position between a connection state that enables transmission of the driving force between the engine 10 and the transmission 21 and a disconnection state that disconnects the transmission.

The clutch 30 can be controlled by the clutch actuator 70 to the half-clutch state in which connection of the clutch 30 is not completely connected, whereby the half-clutch operation, for example, at the time of starting the vehicle 1 and at the time of shifting the transmission 21, can be automated. That is, the clutch 30 is a so-called automatic clutch.

Here, for example, there may be a case where it is difficult to rotate the driving wheel even if the vehicle 1 tries to start, such as a case where the driving wheel is fitted in the recess and stops, a case where the vehicle 1 stops on a steep slope, and the like. In that case, when the clutch 30 is brought into a connected state, the rotation of the engine 10 is stopped by the driving wheel that is stopped, so that the half-clutch operation by the clutch actuator 70 cannot be completed. As a result, the temperature of the plurality of friction plates 46 may rise due to frictional heat generated between the friction plates 46, and the friction plates 46 may be seized. Therefore, the vehicle 1 according to the present disclosure includes the controller 50 that performs clutch protection control for preventing the seizure.

Figure 3:
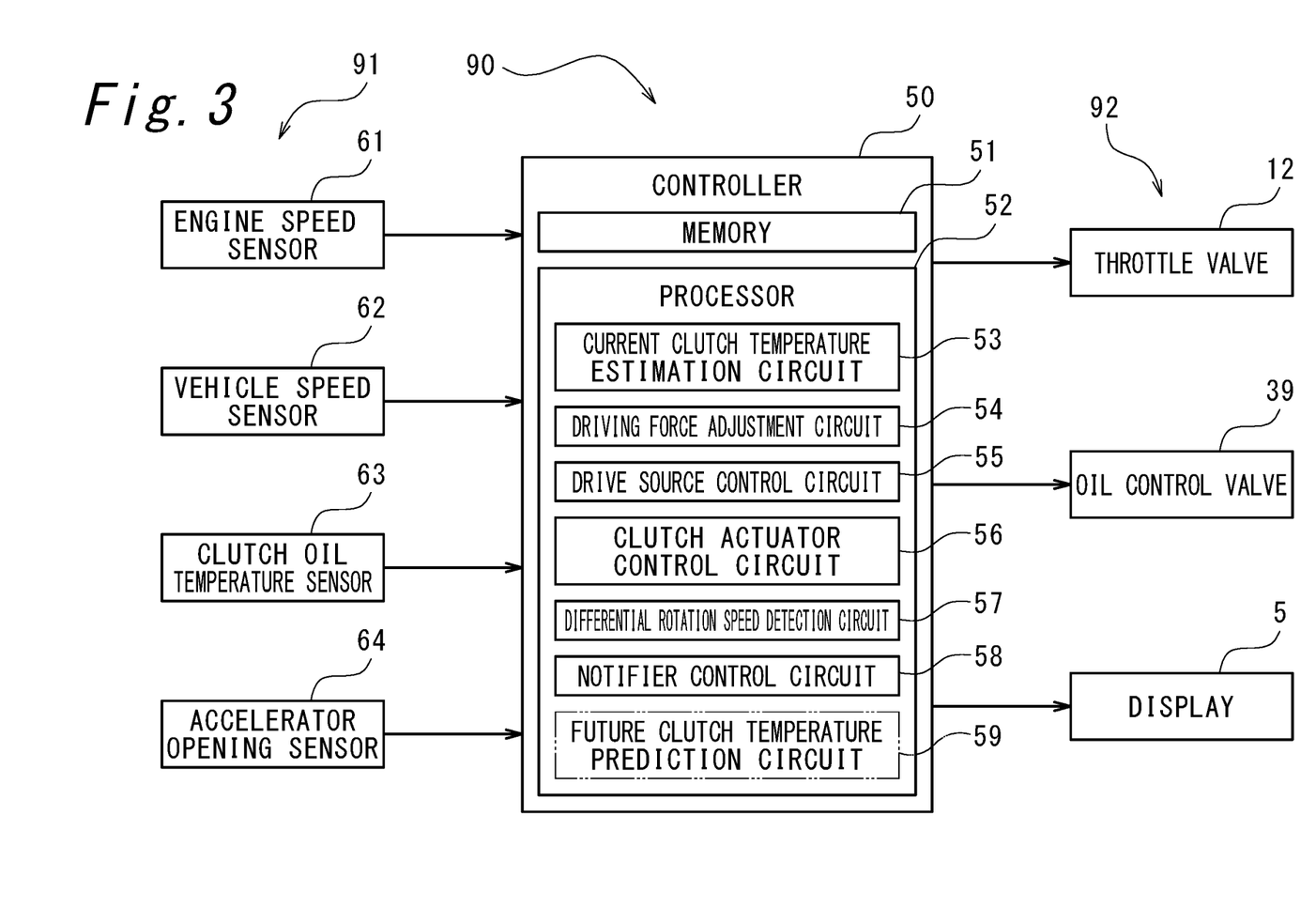
FIG. 3 is a block diagram schematically illustrating a control system according to clutch protection control.

FIG. 3 is a diagram schematically illustrating a control system 90 related to the clutch protection control of vehicle 1. As illustrated in FIG. 3, the control system 90 includes the controller 50, an input device 91, and an output device 92. The controller 50 determines the necessity of the clutch protection control on the basis of the signal from the input device 91, and controls the operation of the output device 92 related to the clutch protection control on the basis of the determination result.

Referring also to FIGS. 1 and 2, the input device 91 includes an engine speed sensor 61, a vehicle speed sensor 62, a clutch oil temperature sensor 63, and an accelerator opening sensor 64. The engine speed sensor 61 is provided in the engine 10 and detects the speed of the crankshaft 11. The vehicle speed sensor 62 is provided in the transmission 21 and detects the rotation speed of an output shaft (not illustrated) output from the transmission 21. The clutch oil temperature sensor 63 is provided in the drain pipe 43 and measures the temperature of the clutch oil flowing through the drain pipe 43. The accelerator opening sensor 64 is provided on the accelerator pedal 7 and detects a driver's operation of depressing the accelerator pedal 7.

The output device 92 includes the throttle valve 12 as a device for controlling the operating state of the engine 20, specifically, a device for controlling the engine speed N, the oil control valve 39 as a device for controlling the operation of the clutch actuator 70, and the display 5 as a notifier for notifying a display related to the clutch protection control. In addition, as the notifier, a display lamp and/or a speaker may be provided instead of or in addition to the display 5.

The controller 50 includes a memory 51 that is a storage device and a processor 52 that is an arithmetic processing device. The memory 51 stores various data and programs related to the clutch protection control.

Functions implemented by the components described in the present specification may be implemented in a circuitry or processing circuitry, including a general purpose processor, an application specific processor, an integrated circuit, an application specific integrated circuit (ASICs), a central processing unit (CPU), a conventional circuit, and/or combinations thereof, programmed to implement the described functions. The processor includes a transistor and other circuits, and is regarded as circuitry or processing circuitry. The processor may be a programmed processor that executes a program stored in a memory. In the present specification, the circuitry, the unit, and the means are hardware programmed to realize the described functions or hardware executing the functions. The hardware may be any hardware disclosed herein or any hardware programmed or known to perform the described functions. In a case where the hardware is a processor regarded as a type of circuitry, the circuitry, means, or unit is a combination of hardware and software used to configure the hardware and/or the processor.

The processor 52 includes a current clutch temperature estimation circuit 53, a driving force adjustment circuit 54, a drive source control circuit 55, a clutch actuator control circuit 56, a differential rotation speed detection circuit 57, and a notifier control circuit 58, as circuits that realize each function related to the clutch protection control.

The current clutch temperature estimation circuit 53 estimates the temperature of clutch 30, for example, the current temperature of the plurality of friction plates 46. In the present embodiment, the current clutch temperature estimation circuit 53 estimates the temperature of the clutch 30 on the basis of a calorific value Q1 generated in the clutch 30, a heat release amount Q2 radiated from the clutch 30, and a heat capacity C of the clutch 30. Hereinafter, the estimated current temperature of the clutch 30 may be referred to as a clutch estimated temperature $T_{CL}$.

The calorific value Q1 can be calculated on the basis of, for example, the clutch transmission torque acting on the plurality of friction plates 46 and the differential rotation speed that is a difference between the rotation speed on the upstream side (that is, the clutch drive shaft 40) and the rotation speed on the downstream side (that is, the transmission input shaft 22) of the driving force transmission path in the clutch 30. For example, the calorific value Q1 may be calculated by further correcting a value based on the clutch transmission torque and the differential rotation speed with use of a heat generation coefficient k1.

The clutch transmission torque can be calculated, for example, on the basis of the pressing force of the piston 35 generated by the hydraulic pressure acting on the piston chamber 36, the area of the abutment region where the plurality of friction plates 46 abut on each other, and the radial position from the central axis O1. The differential rotation speed can be detected by the differential rotation speed detection circuit 57 as described later. The heat generation coefficient k1 can be determined by, for example, an experiment. The clutch transmission torque means a torque that can be transmitted by the clutch, and may also be referred to as a torque transmission capacity in the present specification.

The heat release amount Q2 can be calculated on the basis of, for example, the clutch estimated temperature $T_{CL}$ calculated immediately before and the temperature of the clutch oil. For example, the heat release amount Q2 may be calculated by further correcting the value based on the clutch estimated temperature $T_{CL}$ calculated immediately before and the temperature of the clutch oil, with use of the heat release coefficient k2. The temperature of the clutch oil can be measured by the clutch oil temperature sensor 63. The heat release coefficient k2 can be determined by, for example, an experiment.

The driving force adjustment circuit 54 determines the opening degree of the throttle valve 12 in order to perform driving force adjustment control for adjusting the driving force transmitted to the downstream side of the clutch 30 on the basis of the clutch estimated temperature $T_{CL}$. For example, when the estimated temperature of the clutch 30 is larger than the predetermined threshold $T_1$, the driving force adjustment circuit 54 determines the opening degree of the throttle valve 12 in order to perform the driving force adjustment control. The threshold $T_1$ is set, for example, as a value with a margin with respect to the temperature at which seizure of the clutch 30 immediately occurs.

For example, when the clutch estimated temperature $T_{CL}$ is larger than the predetermined threshold $T_1$, the driving force adjustment circuit 54 determines the throttle opening degree to be a closed-side throttle opening degree adjusted in the closing direction with respect to the user requested throttle opening degree according to the accelerator opening degree detected by the accelerator opening sensor 64 so as to reduce the driving force of the engine 10.

Figure 6:
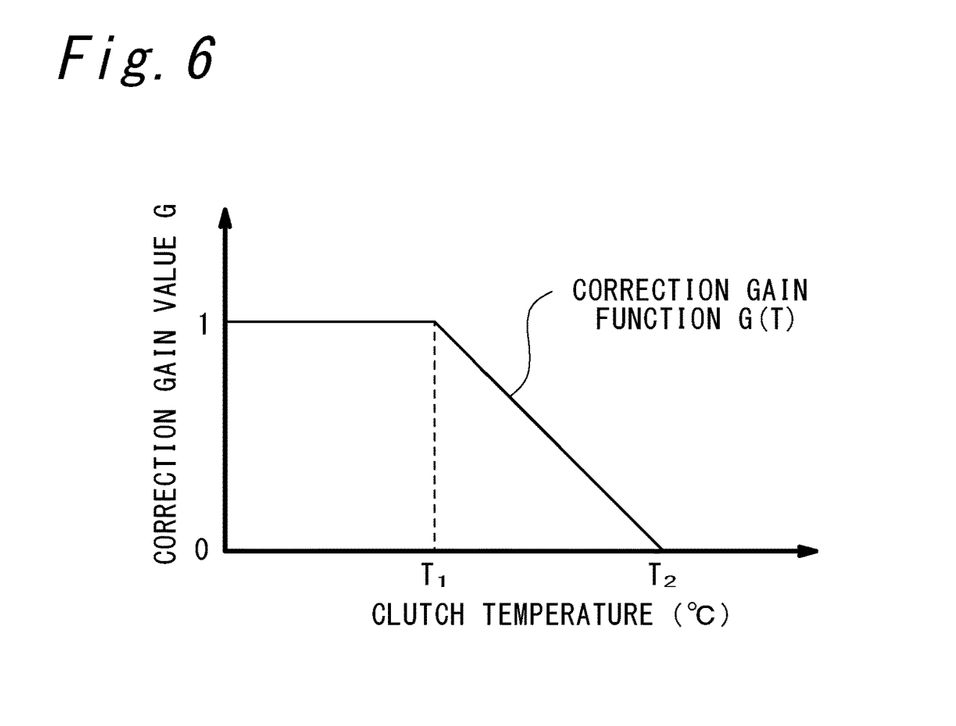
FIG. 6 is a graph schematically illustrating a correction gain of a throttle opening degree according to the clutch protection control.

In the present embodiment, as illustrated in FIG. 6, the driving force adjustment circuit 54 obtains a correction gain value G at the clutch estimated temperature $T_{CL}$ on the basis of a correction gain function G(T), and determines the closed-side throttle opening amount by multiplying the user requested throttle opening amount by the correction gain value G. In the present embodiment, the correction gain function G(T) is set such that the correction gain function G(T) is 1 when the temperature T of the clutch oil is equal to or lower than the threshold $T_1$, decreases linearly when the temperature T exceeds the threshold $T_1$, and is 0 when the temperature T becomes equal to or higher than a threshold $T_2$. The threshold $T_2$ is set to a temperature at which seizure of the clutch 30 is likely to occur when the temperature of the clutch 30 exceeds T2, for example.

The drive source control circuit 55 controls the throttle valve 12 so as to realize a throttle valve opening amount corresponding to the accelerator opening degree detected by the accelerator opening sensor 64. However, when the throttle valve opening amount is determined by the driving force adjustment circuit 54, the throttle valve 12 is controlled so as to realize the determined throttle valve opening amount.

The clutch actuator control circuit 56 controls the operation of the clutch actuator 70 so as to realize a clutch transmission torque that is balanced with the engine torque output from the engine 10. Specifically, the clutch actuator control circuit 56 controls the operation of the oil control valve 39 to adjust the hydraulic pressure of the clutch oil supplied to the piston chamber 36, thereby generating a predetermined fastening load on the plurality of friction plates 46 via the piston 35 to realize the clutch transmission torque balanced with the engine torque.

Further, the clutch actuator control circuit 56 performs the half-clutch control when the vehicle 1 starts and when the transmission 21 shifts. In the half-clutch control, the oil control valve 39 first adjusts the hydraulic pressure of the clutch oil so that the clutch transmission torque in the clutch 30 is lower than the engine torque, and then gradually increases after the rotations of the plurality of friction plates 46 are synchronized, to finally achieve the clutch transmission torque balanced with the engine torque.

The differential rotation speed detection circuit 57 detects a rotation speed difference that is a difference between the rotation speed of the clutch drive shaft 40 and the rotation speed of the transmission input shaft 22. The differential rotation speed detection circuit 57 calculates the rotation speed of the clutch drive shaft 40 on the basis of the rotation speed of the crankshaft 11 detected by the engine speed sensor 61 and a gear ratio by power transmission via the drive gear 13, the idle gear 14, and the driven gear 15. The differential rotation speed detection circuit 57 calculates the rotation speed of the transmission input shaft 22 on the basis of the rotation speed of the output shaft of the transmission 21 detected by the vehicle speed sensor 62 and the gear ratio in the transmission 21 corresponding to the current gear.

The notifier control circuit 58 causes the display 5 to display that the clutch protection control is being executed, that is, that the driving force adjustment control is being executed, to notify the driver.

Next, the flow of the clutch protection control will be described with reference to the flowchart illustrated in FIG. 4 and the subroutine illustrated in FIG. 5. A series of procedures in the flowchart of FIG. 4 and the subroutine of FIG. 5 is repeatedly executed at a predetermined control cycle.

Figure 4:
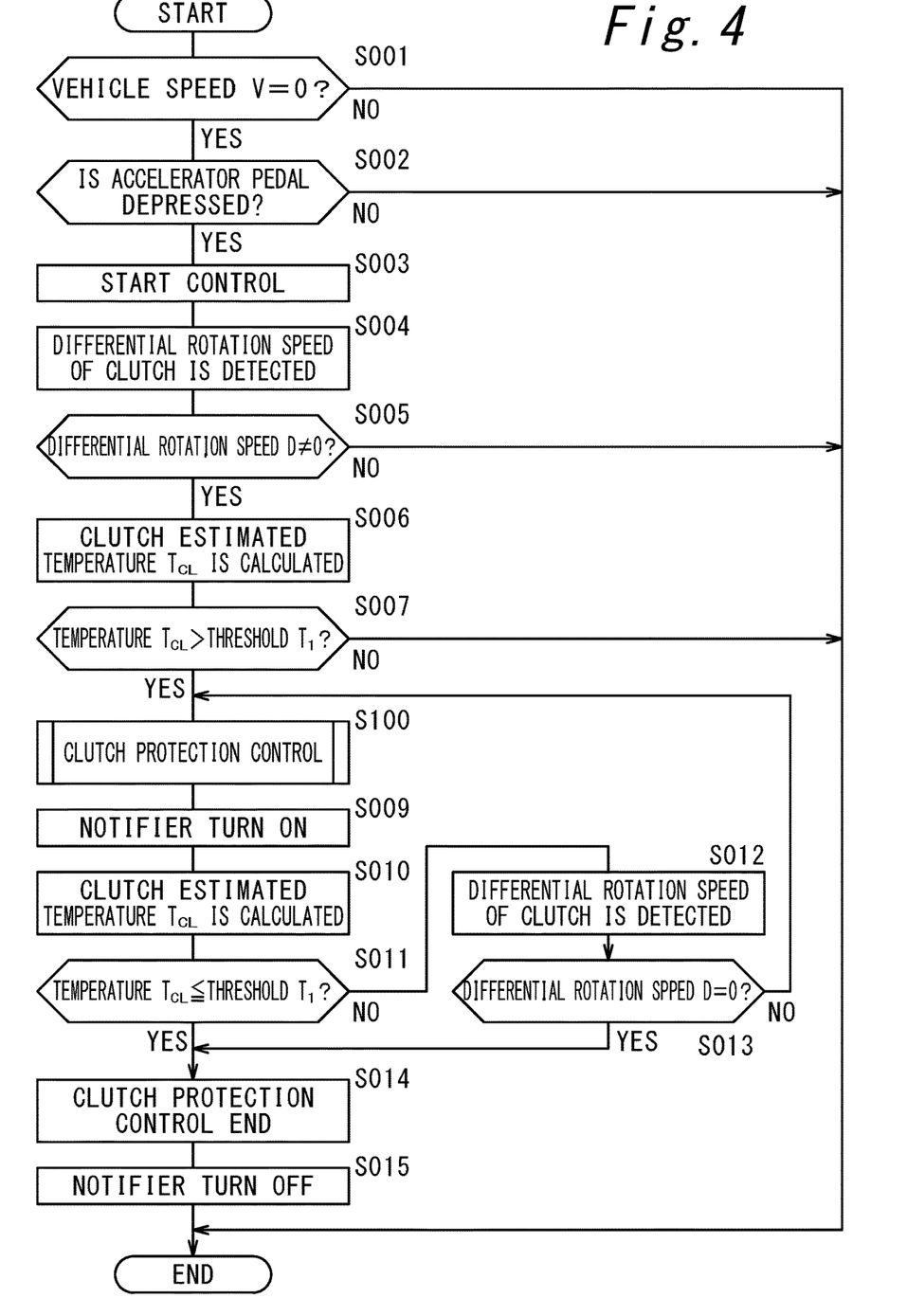
FIG. 4 is a flowchart illustrating a flow of the entire control related to the clutch protection control.
Figure 5:
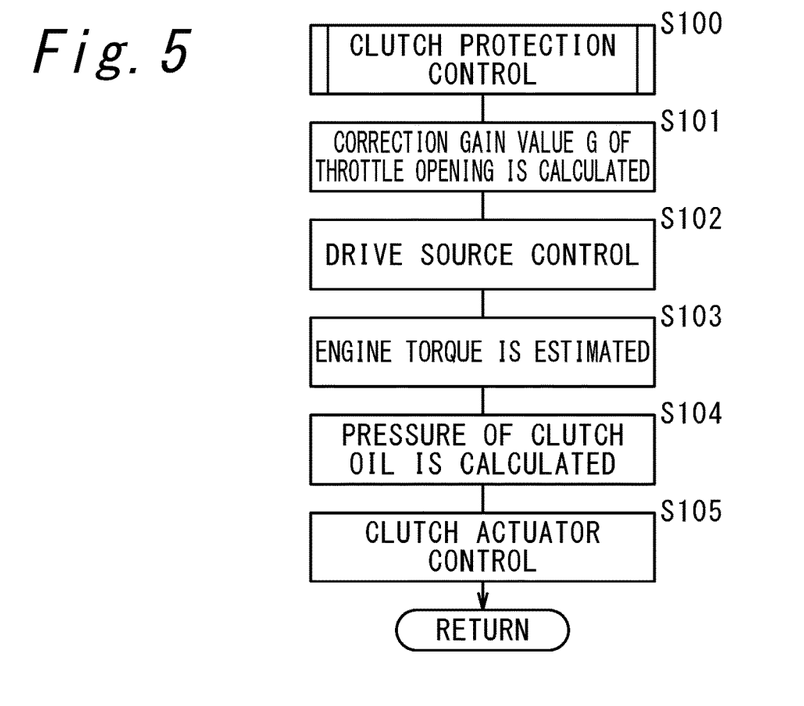
FIG. 5 is a subroutine showing a flow of the clutch protection control.

First, referring to FIG. 4, the controller 50 determines whether the vehicle speed is 0 on the basis of a value detected by the vehicle speed sensor 62 (step S001). When the vehicle speed is 0 (YES in step S001), the controller 50 determines whether the accelerator pedal 7 is depressed on the basis of the value detected by the accelerator opening sensor 64 (step S002). When the depression operation of the accelerator pedal 7 is determined (YES in step S002), the drive source control circuit 55 and the clutch actuator control circuit 56 perform start control (step S003). In the case where step S001 is NO and in the case where step S002 is NO, the clutch protection control is not executed, and the processing in this flowchart ends.

In the start control in step S003, the opening degree of the throttle valve 12 is controlled by the drive source control circuit 55 so that the engine 10 outputs the engine torque corresponding to a detected accelerator opening degree, and the half-clutch control is performed by the clutch actuator control circuit 56.

Next, the differential rotation speed detection circuit 57 detects the differential rotation speed of the clutch 30 (step S004). In step S005, it is determined whether the differential rotation speed is not 0. When the differential rotation speed is not 0 (YES in step S005), the clutch 30 is not in the connected state, and the process proceeds to step S006. On the other hand, when the differential rotation speed is 0 (NO in step S005), it is determined that the clutch 30 is in the connected state, and in this case, the frictional heat between the plurality of friction plates 46 in the clutch 30 does not increase, so that the clutch protection control will not be executed and the process in this flowchart ends.

In step S006, the current clutch temperature estimation circuit 53 calculates the clutch estimated temperature $T_{CL}$ that is the current estimated temperature of the clutch 30. In step S007, it is determined whether the clutch estimated temperature $T_{CL}$ exceeds a predetermined threshold $T_1$. When the clutch estimated temperature $T_{CL}$ exceeds the predetermined threshold $T_1$ (YES in step S007), the process proceeds to step S100 to perform the clutch protection control. On the other hand, when the clutch estimated temperature $T_{CL}$ is equal to or lower than the predetermined threshold $T_1$ (NO in step S007), the clutch protection control is not executed, and the process in this flowchart ends.

As shown in FIG. 5, in the clutch protection control, first, in step S101, the driving force adjustment circuit 54 calculates a correction gain value G of the throttle opening degree on the basis of the clutch estimated temperature $T_{CL}$, and corrects the throttle valve opening amount on the basis of the correction gain value G. Next, in step S102, the drive source control circuit 55 controls the operation of the throttle valve 12 so that the corrected throttle valve opening amount is obtained.

Next, the clutch actuator control circuit 56 calculates the engine torque output from the engine 10 on the basis of the corrected throttle valve opening amount (step S103), calculates the hydraulic pressure of the clutch oil so as to realize the clutch transmission torque balanced with the engine torque (step S104), controls the oil control valve 39 so as to realize the calculated hydraulic pressure of the clutch oil (step S105), and ends the processing in this subroutine.

Returning to FIG. 4, the notifier control circuit 58 causes the display 5 to display that the clutch protection control is being executed (step S009).

Then, in step S010, the current clutch temperature estimation circuit 53 calculates the clutch estimated temperature $T_{CL}$ that is the current estimated temperature of the clutch 30. In step S011, it is determined whether the clutch estimated temperature $T_{CL}$ is equal to or lower than a predetermined threshold $T_1$. When the clutch estimated temperature $T_{CL}$ still exceeds the predetermined threshold $T_1$ (NO in step S011), the differential rotation speed detection circuit 57 detects the differential rotation speed (step S012) and determines whether the differential rotation speed is 0 (step S013).

When the differential rotation speed is not 0 (NO in step S013), the process returns to S100 and the clutch protection control is repeated. When the clutch estimated temperature $T_{CL}$ is equal to or lower than the threshold $T_1$ (YES in step S011) or when the differential rotation speed is 0 (YES in step S013), the clutch protection control ends (step S014), and the process proceeds to step S015. In step S015, the notifier control circuit 58 ends the display on the display 5 indicating that the clutch protection control is being executed.

That is, when the heat generation in the clutch 30 is suppressed by the clutch protection control and the temperature of the clutch 30 becomes equal to or lower than the threshold $T_1$, or when the clutch 30 is fastened and the frictional heat between the plurality of friction plates 46 is no longer increased, the seizure of the clutch 30 is suppressed, and thus the clutch protection control is terminated.

The vehicle 1 according to the above-described embodiment has the following effects.

(1) The vehicle 1 according to the present disclosure includes:
the engine 10;
the front wheel 2 and the rear wheel 3 driven by a driving force output from the engine 10;
the clutch 30 disposed on a driving force transmission path between the engine 10 and the front wheel 2 and the rear wheel 3, the clutch being switchable to an arbitrary fastening position between a connection state that enables transmission of the driving force therebetween and a disconnection state that disconnects the transmission; and
the clutch actuator 70 that applies a fastening load to the clutch 30 and provides a torque transmission capacity corresponding to the fastening load to the clutch 30; and
the controller 50 that controls operation of the engine 10 and operation of the clutch actuator 70.

The controller 50 includes:
the current clutch temperature estimation circuit 53 that estimates a current temperature of the clutch 30; and
the driving force adjustment circuit 54 that performs driving force adjustment control to adjust the driving force transmitted to the downstream side of the clutch 30 on the basis of the estimated clutch estimated temperature $T_{CL}$.

As a result, the driving force transmitted to the downstream side of the clutch 30 is limited on the basis of the clutch estimated temperature $T_{CL}$, so that the clutch 30 is prevented from being seized.

(2) Further, in the vehicle 1 according to the present disclosure,
the driving force adjustment circuit 54 performs driving force adjustment control when the vehicle 1 starts.

As a result, the driving force adjustment control is performed at the start of the vehicle 1 in which the temperature of the clutch 30 is likely to rise.

(3) Further, in the vehicle 1 according to the present disclosure,
the controller 50 further includes the clutch actuator control circuit 56 that controls operation of the clutch actuator 70.

The clutch actuator control circuit 56 performs half-clutch control in which the fastening position of the clutch 30 is set to the half-clutch when the vehicle 1 starts.

As a result, the clutch 30 can be automatically controlled to the half-clutch state.

(4) Further, in the vehicle 1 according to the present disclosure,
the driving force adjustment circuit 54 performs driving force adjustment control when the half-clutch control is performed.

As a result, the driving force adjustment control is performed in the half-clutch state in which the temperature of the clutch 30 is likely to rise.

(5) Further, in the vehicle 1 according to the present disclosure,
in the driving force adjustment control, the driving force adjustment circuit 54 adjusts the power of the engine 10.

As a result, the temperature rise of the clutch 30 is suppressed. When the power of the engine 10 is limited, the rotation speed of the engine 10 decreases, so that the differential rotation speed decreases, whereby the calorific value in the clutch 30 decreases. In addition, the fastening load of the clutch 30 may be limited, and in that case, the friction in the clutch 30 decreases, and thus the calorific value in the clutch 30 also decreases.

(6) Further, in the vehicle 1 according to the present disclosure,
in the driving force adjustment control, the driving force adjustment circuit 54 may adjust both the power of the engine 10 and the fastening load by the clutch actuator 70.

As a result, the temperature rise of the clutch 30 is further suppressed by the synergistic effect of the decrease in the calorific value in the clutch 30 due to the decrease in the rotation speed accompanying the decrease in the power of the engine 10 and the decrease in the calorific value in the clutch 30 due to the decrease in the fastening load of the clutch 30.

(7) Further, in the vehicle 1 according to the present disclosure, in the driving force adjustment control, the driving force adjustment circuit 54 adjusts the driving force transmitted to the downstream side of the clutch 30 when the clutch estimated temperature $T_{CL}$ exceeds the predetermined threshold $T_1$.

As a result, since the power of the vehicle 1 is limited when the temperature of the clutch 30 exceeds the predetermined threshold $T_1$, it is easy to prevent seizure of the clutch 30.

(8) Further, in the vehicle 1 according to the present disclosure, regarding the driving force adjustment control, the driving force adjustment circuit 54 cancels the driving force adjustment control when the clutch estimated temperature $T_{CL}$ becomes equal to or lower than the predetermined threshold $T_1$ or when the starting of the vehicle 1 is completed. Completion of the starting of the vehicle 1 is determined by confirming that the differential rotation speed is zero. In place of or in addition to the determination on the basis of the differential rotation speed, it may be determined that the starting of the vehicle 1 is completed on the basis of the detection result by the vehicle speed sensor 62.

As a result, the clutch 30 is prevented from being seized when the clutch estimated temperature $T_{CL}$ is less than the predetermined threshold $T_1$, and the half-clutch state of the clutch 30 is not continued after the start of the vehicle 1 is completed, so that the clutch 30 is prevented from being seized due to the temperature rise of the clutch 30. Therefore, the driving force adjustment control is prevented from being unnecessarily performed while the seizure of the clutch 30 is prevented.

(9) Further, in the vehicle 1 according to the present disclosure, the current clutch temperature estimation circuit 53 estimates the temperature of clutch 30 on the basis of at least the clutch transmission torque, the differential rotation speed in clutch 30, and the temperature of the clutch oil.

As a result, it is easy to accurately estimate the temperature of the clutch 30 on the basis of at least the clutch transmission torque, the differential rotation speed, and the temperature of the clutch oil.

(10) Further, in the vehicle 1 according to the present disclosure, the current clutch temperature estimation circuit 53 may estimate the temperature of the clutch 30 on the basis of the temperature of the clutch oil.

For example, the current clutch temperature estimation circuit 53 may acquire the correlation between the temperature of the clutch oil and the temperature of the clutch 30 by experiment, and estimate the temperature of the clutch 30 by calculation on the basis of the temperature of the clutch oil or by referring to a table prepared in advance.

As a result, it is easy to accurately estimate the temperature of the clutch 30 on the basis of the temperature of the clutch oil.

(11) Further, in the vehicle 1 according to the present disclosure, the current clutch temperature estimation circuit 53 estimates the temperature of the clutch 30 on the basis of an estimated calorific value in the clutch 30, and an estimated heat release amount from the clutch 30.

As a result, the temperature of the clutch 30 can be easily estimated more accurately on the basis of the calorific value in the clutch 30 and the heat release amount from the clutch 30.

(12) Further, the vehicle 1 according to the present disclosure further includes a display 5, and the controller 50 further includes the notifier control circuit 58 that causes the display 5 to notify that the driving force adjustment control is being executed when the driving force adjustment control is being executed.

As a result, it is easy to notify the driver that the driving force adjustment control is being executed via the display 5.

Further, another aspect of the present disclosure is a method for controlling a vehicle, the vehicle including:

the engine 10;

the front wheel 2 and the rear wheel 3 driven by the driving force output from the engine 10;

the clutch 30 disposed on a driving force transmission path between the engine 10 and the front wheel 2 and the rear wheel 3, the clutch being switchable to an arbitrary fastening position between a connection state that enables transmission of the driving force therebetween and a disconnection state that disconnects the transmission;

the clutch actuator 70 that applies a fastening load to the clutch 30 and provides a torque transmission capacity corresponding to the fastening load to the clutch 30; and the controller 50 that controls operation of the engine 10 and operation of the clutch actuator 70.

The method includes:

estimating the current temperature of the clutch 30; and adjusting the driving force transmitted to the downstream side of the clutch 30 on the basis of the estimated temperature of the clutch 30.

Further, still another aspect of the present disclosure is a controller for a vehicle, the vehicle including:

the engine 10;

the front wheel 2 and the rear wheel 3 driven by the driving force output from the engine 10;

the clutch 30 disposed on a driving force transmission path between the engine 10 and the front wheel 2 and the rear wheel 3, the clutch being switchable to an arbitrary fastening position between a connection state that enables transmission of the driving force therebetween and a disconnection state that disconnects the transmission; and the clutch actuator 70 that applies a fastening load to the clutch 30 and provides a torque transmission capacity corresponding to the fastening load to the clutch 30.

The controller 50 includes:

a current clutch temperature estimation circuit 53 that estimates the temperature of the clutch 30; and a driving force adjustment circuit 54 that performs driving force adjustment control to adjust the driving force transmitted to the downstream side of the clutch 30 on the basis of the estimated temperature of the clutch 30.

In the above embodiment, the clutch protection control is performed on the basis of the clutch estimated temperature $T_{CL}$ estimated by the current clutch temperature estimation circuit 53. Alternatively or additionally, the clutch protection control may be performed in the case where a predicted clutch temperature that is a future temperature of the clutch 30 is predicted and it is predicted that the predicted clutch temperature exceeds the predetermined threshold $T_1$. That is, as illustrated in FIG. 3, in order to predict the predicted clutch temperature, a future clutch temperature prediction circuit 59 indicated by a two-dot chain line may be provided in the controller 50.

For example, the future clutch temperature prediction circuit 59 may estimate the future temperature of the clutch 30 on the basis of the transition of the temperature of the clutch 30 estimated by the current clutch temperature estimation circuit 53.

In the above embodiment, the clutch actuator 70 is configured to adjust the clutch fastening load by hydraulic pressure using the oil control valve 39, but any actuator may be used. For example, the fastening load may be adjusted by adjusting the position of the piston 35 by a moving mechanism using a motor, a ball screw, or the like.

In the above embodiment, the case where the drive source is the engine 10 has been described as an example, but any drive source such as an electric motor can be used.

In the above embodiment, the driving force adjustment circuit 54 is configured to adjust the power of the engine 10 by adjusting the opening degree of the throttle valve 12, but the power of the engine 10 may be adjusted by adjusting the ignition timing, the fuel injection timing, the fuel injection amount, and the like. The driving force adjustment circuit 54 may be configured only to adjust, specifically, only to decrease, the clutch fastening load of the clutch actuator 70. By reducing the clutch fastening load, frictional heat that can be generated between the plurality of friction plates 46 can be reduced.

Various modifications and alterations can be made without departing from the scope of the present disclosure.

What is claimed is:

1. A vehicle comprising:
    a drive source;
    a throttle valve configured to be opened to an adjustable degree to control an output of the drive source;
    a driving wheel driven by a driving force output from the drive source;
    a clutch disposed between the drive source and the driving wheel, the clutch being switchable to an arbitrary fastening position between a connection state enabling transmission of the driving force between the drive source and the driving wheel and a disconnection state disconnecting the transmission of the driving force;
    a clutch actuator configured to apply a fastening load to the clutch and to provide a torque transmission capacity corresponding to the fastening load to the clutch; and
    a controller configured to control an operation of the drive source and an operation of the clutch actuator, the controller including:
        a drive source control circuit configured to electrically control a throttle opening degree of the throttle valve to control the output of the drive source;
        a clutch temperature estimation circuit configured to estimate a temperature of the clutch; and
        a driving force adjustment circuit configured to perform a driving force adjustment control to adjust the driving force transmitted to a downstream side of the clutch on a basis of an estimated temperature of the clutch; and
        a clutch actuator control circuit configured to control the clutch actuator to achieve a fastening load balanced with the output of the drive source,
    wherein the driving force adjustment circuit is configured to control the throttle opening degree to be a closed-side throttle opening degree during the driving force adjustment control, the closed-side throttle opening degree being determined by multiplying a requested throttle opening degree corresponding to the operation amount of the drive source control circuit by a correction gain value determined by a correction gain function, and
    wherein the controller is configured such that, when the estimated temperature of the clutch exceeds a predetermined threshold temperature:
        the driving force adjustment circuit sets the correction gain value to less than 1 using the correction gain function;
        the driving force adjustment circuit controls the throttle opening degree to be the closed-side throttle opening degree lower than the requested throttle opening degree so that the driving force output of the drive source transmitted to the downstream side of the clutch is decreased; and
        the clutch actuator control circuit controls the clutch actuator to achieve the fastening load balanced with the decreased driving force output of the drive source.

2. The vehicle according to claim 1, wherein the driving force adjustment circuit is configured to perform the driving force adjustment control when the vehicle starts.

3. The vehicle according to claim 1, wherein
    the clutch actuator control circuit is further configured to perform a half-clutch control in which the fastening position of the clutch is set to a half-clutch when the vehicle starts.

4. The vehicle according to claim 3, wherein the driving force adjustment circuit is configured to perform the driving force adjustment control when the half-clutch control is performed.

5. The vehicle according to claim 1, wherein the driving force adjustment circuit is configured to cancel the driving force adjustment control when the estimated temperature of the clutch becomes equal to or lower than the predetermined threshold temperature or when starting of the vehicle is completed.

6. The vehicle according to claim 1, wherein the clutch temperature estimation circuit is configured to estimate the temperature of the clutch based on at least the fastening load of the clutch, a differential rotation speed that is a difference between a rotation speed on an upstream side of the clutch and a rotation speed on the downstream side of the clutch in a driving force transmission path with the clutch interposed therebetween, and a temperature of clutch oil lubricating the clutch.

7. The vehicle according to claim 1, wherein the clutch temperature estimation circuit is configured to estimate the temperature of the clutch based on a temperature of clutch oil lubricating the clutch.

8. The vehicle according to claim 1, wherein the clutch temperature estimation circuit is configured to estimate the temperature of the clutch based on an estimated calorific value in the clutch and an estimated heat release amount from the clutch.

9. The vehicle according to claim 1, wherein the controller further includes a notifier control circuit configured to generate a notification that the driving force adjustment control is being executed when the driving force adjustment control is being executed.

10. The vehicle according to claim 1, wherein the clutch is an automatic clutch configured to have the fastening load is set by the clutch actuator controlled by the controller, and connection of the clutch is automatically performed.

11. A control method for a vehicle,
the vehicle including:
a drive source;
a throttle valve configured to be opened to an adjustable degree to control an output of the drive source;
a driving wheel driven by a driving force output from the drive source;
a clutch disposed between the drive source and the driving wheel, the clutch being switchable to an arbitrary fastening position between a connection state enabling transmission of the driving force between the drive source and the driving wheel and a disconnection state disconnecting the transmission of the driving force;
a clutch actuator configured to apply a fastening load to the clutch and to provide a torque transmission capacity corresponding to the fastening load to the clutch; and
a controller configured to control an operation of the drive source and an operation of the clutch actuator, the controller including a drive source control circuit configured to electrically control a throttle opening degree of the throttle valve to control the output of the drive source,
the method comprising:
estimating a temperature of the clutch;
performing a driving force adjustment control including adjusting the driving force transmitted to a downstream side of the clutch on a basis of an estimated temperature of the clutch;
controlling the clutch actuator to achieve a fastening load balanced with the output of the drive source,
wherein the driving force adjustment control includes controlling the throttle opening degree to be a closed-side throttle opening degree during the driving force adjustment control, the closed-side throttle opening degree being determined by multiplying a requested throttle opening degree corresponding to the operation amount of the drive source control circuit by a correction gain value determined by a correction gain function, and
when the estimated temperature of the clutch exceeds the predetermined threshold temperature, the controller:
sets the correction gain value to less than 1 using the correction gain function;
controls the throttle opening degree to be the closed-side throttle opening degree lower than the requested throttle opening degree so that the driving force output of the drive source transmitted to the downstream side of the clutch is decreased; and
controls the clutch actuator to achieve the fastening load balanced with the decreased driving force output of the drive source.

12. A controller of a vehicle,
the vehicle including:
a drive source;
a throttle valve configured to be opened to an adjustable degree to control an output of the drive source;
a driving wheel driven by a driving force output from the drive source;
a clutch disposed between the drive source and the driving wheel, the clutch being switchable to an arbitrary fastening position between a connection state enabling transmission of the driving force between the drive source and the driving wheel and a disconnection state disconnecting the transmission of the driving force; and
a clutch actuator configured to apply a fastening load to the clutch and to provide a torque transmission capacity corresponding to the fastening load to the clutch,
the controller comprising:
a drive source control circuit configured to electrically control a throttle opening degree of the throttle valve to control the output of the drive source;
a clutch temperature estimation circuit configured to estimate a temperature of the clutch; and
a driving force adjustment circuit configured to perform a driving force adjustment control to adjust the driving force transmitted to a downstream side of the clutch on a basis of an estimated temperature of the clutch; and
a clutch actuator control circuit configured to control the clutch actuator to achieve a fastening load balanced with the output of the drive source,
wherein the driving force adjustment circuit is configured to control the throttle opening degree to be a closed-side throttle opening degree during the driving force adjustment control, the closed-side throttle opening degree being determined by multiplying a requested throttle opening degree corresponding to the operation amount of the drive source control circuit by a correction gain value determined by a correction gain function, and
wherein the controller is configured such that, when the estimated temperature of the clutch exceeds the predetermined threshold temperature:
the driving force adjustment circuit sets the correction gain value to less than 1 using the correction gain function;
the driving force adjustment circuit controls the throttle opening degree to be the closed-side throttle opening degree lower than the requested throttle opening degree so that the driving force output of the drive source transmitted to the downstream side of the clutch is decreased; and
the clutch actuator control circuit controls the clutch actuator to achieve the fastening load balanced with the decreased driving force output of the drive source.

* * * * *